(12) United States Patent
Bauer et al.

(10) Patent No.: US 8,397,491 B2
(45) Date of Patent: Mar. 19, 2013

(54) DEVICE FOR INTRODUCING A LIQUID REDUCING AGENT INTO AN EXHAUST GAS OF A COMBUSTION SYSTEM

(75) Inventors: Peter Bauer, Immenreuth (DE); Rainer Bentz, St. Wendel (DE); Joachim Frank, Coburg (DE); Hermann Ketterl, Stephansposching (DE)

(73) Assignee: Continental Automotive GmbH, Hannover (DE)

( * ) Notice: Subject to any disclaimer, the term of this patent is extended or adjusted under 35 U.S.C. 154(b) by 277 days.

(21) Appl. No.: 12/678,537

(22) PCT Filed: Sep. 1, 2008

(86) PCT No.: PCT/EP2008/061460
§ 371 (c)(1),
(2), (4) Date: Mar. 17, 2010

(87) PCT Pub. No.: WO2009/037098
PCT Pub. Date: Mar. 26, 2009

(65) Prior Publication Data
US 2010/0205948 A1      Aug. 19, 2010

(30) Foreign Application Priority Data
Sep. 18, 2007   (DE) .......................... 10 2007 044 403

(51) Int. Cl.
| | |
|---|---|
| *F01N 3/00* | (2006.01) |
| *E03B 7/07* | (2006.01) |
| *F16K 37/00* | (2006.01) |
| *F17D 3/00* | (2006.01) |
| *B65D 88/54* | (2006.01) |
| *G01F 11/00* | (2006.01) |

(52) U.S. Cl. .............. 60/286; 60/274; 60/295; 137/558; 222/318
(58) Field of Classification Search .................... 60/286, 60/295, 274; 137/558, 206, 207.5; 222/318; 128/204.21
See application file for complete search history.

(56) References Cited

U.S. PATENT DOCUMENTS
(Continued)

FOREIGN PATENT DOCUMENTS
| DE | 19947197 A1 | 4/2001 |
|---|---|---|
| DE | 10351458 A1 | 6/2005 |

(Continued)

OTHER PUBLICATIONS

International PCT Search Report, PCT/EP2008/061460, 2 pages, mailed Dec. 10, 2008.

*Primary Examiner* — Thomas Denion
*Assistant Examiner* — Dapinder Singh
(74) *Attorney, Agent, or Firm* — King & Spalding L.L.P.

(57) ABSTRACT

A device (4) for introducing a liquid reducing agent (5) into an exhaust gas (6) of a combustion system (2) has a reservoir (20), a discharge element (23) for discharging the liquid reducing agent (5) into the exhaust gas (6), a feed line (22), interposed between the reservoir (20) and the discharge element (23), a delivery element (26) arranged in the feed line (22) for delivering the liquid reducing agent (5) in a direction of delivery (29) from the reservoir (20) to the discharge element (23). The feed line (22) is associated with a controllable venting element (34) upstream of the delivery element (26), the discharge element (23) is connected to the reservoir (20) via a return line (32) and a controllable shut-off element (36) is arranged in the return line (32).

12 Claims, 2 Drawing Sheets

U.S. PATENT DOCUMENTS

| | | | |
|---|---|---|---|
| 4,926,829 A * | 5/1990 | Tuckey | 123/497 |
| 5,884,475 A * | 3/1999 | Hofmann et al. | 60/274 |
| 7,017,335 B2 * | 3/2006 | Huber et al. | 60/286 |
| 7,100,366 B2 * | 9/2006 | Hager et al. | 60/286 |
| 7,594,393 B2 * | 9/2009 | Offenhuber et al. | 60/286 |
| 7,654,080 B2 * | 2/2010 | Ripper et al. | 60/286 |
| 7,721,533 B2 * | 5/2010 | Imoehl et al. | 60/286 |
| 7,775,036 B2 * | 8/2010 | Barcin | 60/286 |
| 7,818,961 B2 * | 10/2010 | Leonard | 60/286 |
| 2003/0234000 A1 * | 12/2003 | Ruesseler et al. | 123/445 |
| 2005/0252201 A1 * | 11/2005 | Lecea et al. | 60/286 |
| 2007/0068525 A1 * | 3/2007 | Offenhuber et al. | 128/204.21 |
| 2007/0283685 A1 | 12/2007 | Ripper et al. | 60/288 |
| 2010/0326546 A1 * | 12/2010 | Haeberer et al. | 137/558 |

FOREIGN PATENT DOCUMENTS

| | | |
|---|---|---|
| DE | 102004054238 A1 | 5/2006 |
| DE | 102006019973 A1 | 10/2007 |
| EP | 1656986 A1 | 5/2006 |
| WO | 2005/045209 A1 | 5/2005 |

\* cited by examiner

DEVICE FOR INTRODUCING A LIQUID REDUCING AGENT INTO AN EXHAUST GAS OF A COMBUSTION SYSTEM

CROSS-REFERENCE TO RELATED APPLICATIONS

This application is a U.S. National Stage Application of International Application No. PCT/EP2008/061460 filed Sep. 1, 2008, which designates the United States of America, and claims priority to German Application No. 10 2007 044 403.8 filed Sep. 18, 2007, the contents of which are hereby incorporated by reference in their entirety.

TECHNICAL FIELD

The invention relates to an apparatus for introducing a reducing agent liquid into an exhaust gas of a combustion system, having a storage tank, having a delivery means for delivering the reducing agent liquid in a conveying direction into the exhaust gas, having a feed line disposed between the storage tank and the delivery means, having a conveying means disposed in the feed line for conveying the reducing agent liquid from the storage tank to the delivery means.

BACKGROUND

When converting fossil fuel or biofuel to mechanical and/or thermal energy, the aim is to achieve high levels of efficiency. In this case, the conversion temperatures are often so high that during the conversion (combustion) nitrous oxides are formed to a significant extent.

As a release of the nitrous oxides is undesirable and hence to be avoided, the nitrous oxides are usually catalytically reduced. For elimination of the nitrous oxides the selective catalytic reduction method (also known as the SCR method) in particular has established itself as a technically easily controllable method that is used to remove nitrous oxides from exhaust gases of a combustion system, also an internal combustion engine, in particular a diesel engine.

In this method the nitrous oxides contained in the exhaust gas are converted in the presence of oxygen at a selective reduction catalytic converter by means of a suitable reducing agent into molecular nitrogen and water. As a reducing agent ammonia has won through against other reducing agents such as hydrocarbons or cyanuric acid.

Ammonia is a strong-smelling and—in a higher concentration—also toxic compound. The reducing agent needed to remove nitrous oxides from the exhaust gases of an internal combustion engine for example of a vehicle is therefore carried in a storage tank in the vehicle frequently in the form of an aqueous urea solution, from which the ammonia may be released, in particular by hydrolysis, in the quantity needed for the removal of nitrous oxides.

For this purpose, from DE 10 2004 054 238 A1 it is known for the aqueous urea solution to be added in a conveying direction from a storage tank via a delivery pump and a feed line through a delivery means to the exhaust gas of an internal combustion engine.

SUMMARY

According to various embodiments, an alternative apparatus can be provided with a long service life for introducing a reducing agent liquid into an exhaust gas of a combustion system, with the proviso that the apparatus is as economical as possible to realize.

According to an embodiment, an apparatus for introducing a reducing agent liquid into an exhaust gas of a combustion system, may comprise a storage tank, a delivery means for delivering the reducing agent liquid into the exhaust gas, a feed line disposed between the storage tank and the delivery means, a conveying means disposed in the feed line for conveying the reducing agent liquid in a conveying direction from the storage tank to the delivery means, an actuable venting means associated with the feed line upstream of the conveying means, wherein the delivery means is connected by a return line to the storage tank, and an actuable shut-off means is disposed in the return line.

According to a further embodiment, a heating apparatus can be associated with the return line and/or the feed line. According to a further embodiment, the venting means can be connected by an intake line to the storage tank. According to a further embodiment, the venting means and the shut-off means each may take the form of a valve. According to a further embodiment, the valves can be ⅔-way valves. According to a further embodiment, the delivery means can be an injection valve. According to a further embodiment, the conveying means can be a diaphragm pump.

BRIEF DESCRIPTION OF THE DRAWINGS

An embodiment is described in detail with reference to drawings. In the drawings equivalent parts are provided with identical reference characters. The drawings show in diagrammatic representation.

DETAILED DESCRIPTION

Figure 1:
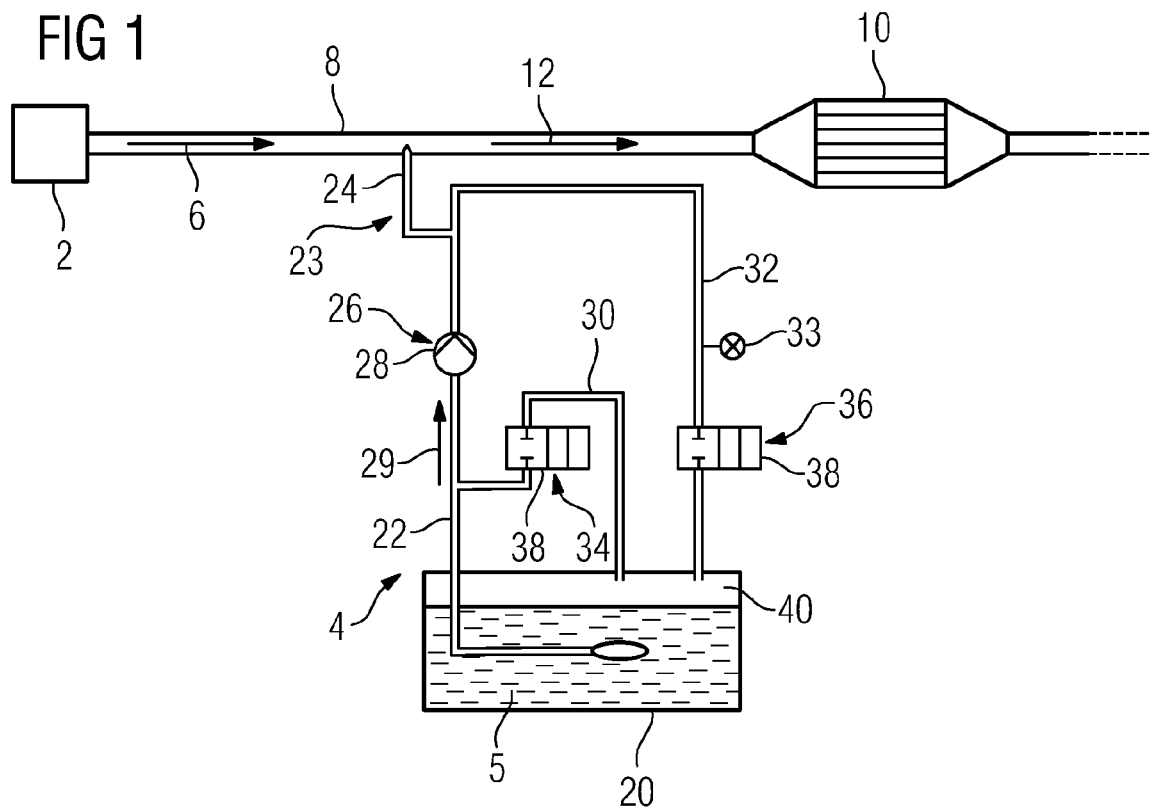
FIG. 1 an apparatus connected to an exhaust train for introducing a reducing agent liquid in a first operating state.

According to various embodiments, an apparatus for introducing a reducing agent liquid into an exhaust gas of a combustion system, may have a storage tank, a delivery means for delivering the reducing agent liquid into the exhaust gas, a feed line disposed between the storage tank and the delivery means, and a conveying means disposed in the feed line for conveying the reducing agent liquid in a conveying direction from the storage tank to the delivery means, wherein an actuable venting means is associated with the feed line upstream of the conveying means, wherein the delivery means is connected by a return line to the storage tank, and wherein an actuable shut-off means is disposed in the return line.

In the event of freezing of the reducing agent liquid, there is the risk of damage to the components of the apparatus that contain the reducing agent, for example the feed line. To prevent damage it is known, particularly in the event of correspondingly low temperatures, to empty the reducing agent liquid for example out of the feed line. In this case, in order to prevent unnecessary waste of the reducing agent liquid and the resulting pollution of the environment, it is known for example from DE 10 2004 054 238 A1 to pump the reducing agent liquid back into the storage tank counter to the conveying direction during normal operation.

According to the present prior art, for this purpose as a rule a cost-intensive feed pump with a reversible direction of rotation is used. Alternatively, an economical feed pump with a constant direction of rotation is used, wherein for a reversal of the conveying direction an, as a rule, expensive special valve, often a 4/2-way valve, i.e. a valve having 4 ports and 2 switch positions, is used to transpose the pump inlet and the pump outlet.

According to various embodiments, now a quite different approach is taken. Instead of achieving an emptying of the reducing agent liquid into the storage tank by means of a reversal of the conveying direction of for example the feed pump, the emptying into the storage tank is effected without a reversal of the conveying direction and of the cost-intensive components associated therewith, such as for example a feed pump with a reversible direction of rotation or a 4/2-way valve.

Instead, an actuable venting means and a return line with an actuable shut-off means are provided for emptying the reducing agent liquid out of the feed line into the storage tank without a reversal of the conveying direction.

The venting means for an emptying operation allows an admission of a gaseous medium into the feed line and otherwise prevents such an admission. For this purpose, the venting means is disposed for example at an inlet opening of the feed line, wherein the venting means for example releases the inlet opening for the admission of a gas or closes the inlet opening to prevent such an admission. The venting means itself in this case is for example an actuable closure element, for example a switch or a gate valve, which upon opening allows, or upon closing prevents, an admission of gas into the feed line.

The venting means is disposed for this purpose for example on the feed line itself or alternatively on a nozzle or on a tube. Such a nozzle or tube then opens out for example with an opening into an inlet opening of the feed line. An arrangement of the venting means on a branch line of the feed line is particularly easy to realize. In this case it may be provided that, upon opening of the venting means, a gas from a gas reservoir is fed, for example through the branch line, to the feed line. In this case the branch line for example opens out into a corresponding gas reservoir, which for an emptying operation provides for example a gas that is suitable in terms of its chemical properties. Alternatively, the branch line for example may simply terminate in the ambient air or in the exhaust gas.

By means of the shut-off means, which is designed for example as a shut-off valve, it is possible to open and close the return line relative to the storage tank. Upon opening of the shut-off means it is possible, for example in the case of an emptying operation, to remove the reducing agent liquid through the return line into the storage tank. The shut-off means in this case is provided for example in the form of a switch or a gate valve.

For an emptying operation the venting means and the shut-off means are opened.

As a result of the opening of the venting means the conveying means, i.e. for example a pump without a reversible direction of rotation, which is disposed—viewed in conveying direction
   downstream of the venting means, conveys—as it were, sucks
   the very much lighter gaseous medium instead of the "heavy" reducing agent liquid into the feed line.

By means of the gas, for example a gas bubble, conveyed into the feed line the reducing agent liquid that is situated in the feed line and is to be emptied is then to a certain extent pushed through the feed line, in conveying direction towards the delivery means.

For an emptying operation the shut-off means is likewise open, i.e. the return line is open in the direction of the storage tank. This prevents in particular the build-up of a delivery pressure at the delivery means, which often comprises a nozzle. Thus, the reducing agent liquid displaced by the gas in the direction of the delivery means is not delivered through the delivery means but continues to be displaced for example by the gas bubble into the storage tank. In addition or alternatively it is for example possible that the delivery means, for example the nozzle, may be shut off for an emptying operation, so that an emptying through the delivery means is additionally prevented.

An emptying of the feed line therefore occurs without a reversal of the conveying direction of the conveying means. It is therefore possible for example to use an economical pump without a reversible direction of rotation for an emptying operation.

During normal operation, i.e. during the delivery of the reducing agent liquid into the exhaust gas, the venting means and the shut-off means are closed. Closed, in the case of the venting means, means that the venting means prevent an admission of gas into the feed line. Thus, upon an actuation of the conveying means the reducing agent liquid is conveyed from the storage tank to the delivery means. Closed, in the case of the shut-off means, means that the return line is closed relative to the storage tank. This allows in particular the build-up of a delivery pressure at the delivery means since no relief of pressure into the storage tank occurs through the return line. Consequently, the reducing agent liquid is delivered through the delivery means into the exhaust gas. It is alternatively or additionally possible, for example given a delivery means that may be shut off, to open the delivery means to allow delivery.

In the case of an open venting means and a simultaneously closed shut-off means, it is possible in particular to realize a purging of the feed line. In this case, the conveying means "sucks in" air for example through the venting means. The air thus "sucked in" is delivered, together with the reducing agent liquid situated in the feed line, through the delivery means. The feed line is, as it were, "purged" with gas. It is thereby possible for example to prevent a clogging of the feed line by adhering residues. A purging of the feed line is realized in particular in a particularly simple, economical manner because for example no additional purging valve is required.

In the case of a closed venting means and a simultaneously open shut-off means, an in-circuit pumping of the reducing agent liquid is realized in such a way that the liquid from the storage tank is conveyed through the feed line and the return line back into the storage tank. With such in-circuit pumping it is for example possible to bring about a temperature equalization between the reducing agent liquid in the storage tank and in the rest of the system. Such a temperature equalization may for example be desirable if the temperature of the reducing agent liquid in the storage tank rises above a desired temperature, i.e. is too warm. In the course of in-circuit pumping of the warm reducing agent liquid the reducing agent liquid cools down for example in the feed line and the return line and is returned in a cooled state to the storage tank.

The reducing agent liquid is for example a liquid reducing agent or a precursor substance convertible to the reducing agent that is chemically or thermally convertible to a reducing agent. To convert such a precursor substance, which is provided for example in the form of an aqueous urea solution or in the form of ammonia water, it is introduced directly into the exhaust gas or alternatively into a processing reactor. In the course of hydrolysis or thermolysis or as a result of a chemical reaction the precursor substance is transformed into the reducing agent. For conversion purposes the apparatus optionally comprises a processing reactor.

By means of the feed line the reducing agent liquid, or the converted reducing agent liquid, is conveyed from the storage tank to the delivery means, by which it is added to the exhaust gas in particular upstream of a reduction catalytic converter for reaction with the nitrous oxides. The delivery means for this purpose is provided in the form of an injection nozzle that may be shut off, by means of which the reducing agent liquid is injected into the exhaust gas, optionally with simultaneous aerosol formation.

By means of the conveying means the reducing agent liquid is conveyed out of the storage tank and through the feed line, optionally with simultaneous conversion to the reducing agent, and into the delivery means. The conveying means is for example a feed pump or alternatively a compressed-air pump.

A heating apparatus is preferably associated with the return line and/or the feed line. This makes it possible, on the one hand, to prevent the reducing agent liquid from freezing up at low temperatures for example in the feed line and the return line. On the other hand, it also makes it possible to heat the reducing agent liquid in the storage tank in that for example the reducing agent liquid being pumped in the circuit is heated as it passes through the heated feed line and return line and the liquid thus warmed is fed back to the storage tank.

The venting means is advantageously connected by an intake line to the storage tank. When the venting means is open, a gas situated in the storage tank may therefore be conveyed through the intake line into the feed line. This achieves two things. Firstly, in an inexpensive manner air that is low in particles is used for the emptying operation. This in the long term prevents a clogging of the feed line and in particular of the delivery means, for example the injection nozzle. Secondly, it is thereby guaranteed that the reducing agent liquid does not pass out of the system through "uncontrolled" outlet openings and possibly cause corrosion damage. In the case of a reducing agent liquid in the form of an aqueous urea solution it is known for example that urea that crystallizes out from the urea solution, owing to its creep properties, "creeps" out of an existing outlet opening. Such creep behavior is known for example also in the case of salt crystals that crystallize out from a solution of common salt. In this situation the intake line, which opens out into the storage tank, prevents the urea for example from passing in an uncontrolled manner out of the "system".

According to a further embodiment, the venting means and the shut-off means each take the form of a valve. In this case, the venting means and the shut-off means may for example each take the form of a diaphragm valve. Equally possible is for example the form of a diaphragm. A valve may be operated, for example in an electromagnetic manner, quickly and precisely, thereby allowing a rapid reaction to operation-related requirements.

In an embodiment the valves are 2/2-way valves. Here, by a 2/2-way valve is meant a valve having 2 ports and 2 switch positions. In terms of its design, a 2/2-way valve is a mechanically simple valve and hence inexpensive to manufacture.

The delivery means is advantageously an injection valve. The use of an injection valve to introduce the reducing agent liquid into the exhaust gas presents itself because an injection valve is frequently used to deliver liquids and therefore, as a mass-produced component, is relatively inexpensive.

The conveying means is preferably a diaphragm pump. In a diaphragm pump the medium to be conveyed, i.e. in the present case the reducing agent liquid, is separated by a diaphragm from the mechanical parts of the pump. As a result, the mechanical parts are protected from detrimental influences of the reducing agent liquid. A diaphragm pump is therefore eminently suitable for conveying the reducing agent liquid, which occasionally has a corrosive effect.

FIG. 1 shows a combustion system 2, which is equipped with an apparatus 4 for introducing a reducing agent liquid 5.

According to FIG. 1 there is disposed on the combustion system 2 in the form of an internal combustion engine an exhaust gas line 8 for removing the exhaust gases that arise during operation of the combustion system 2. The exhaust gases 6 from the combustion system 2 are conveyed through the exhaust gas line 8 to a reduction catalytic converter 10, through which they flow. The reduction catalytic converter 10 is in particular a deNOx catalytic converter, by means of which the nitrous oxides contained in the exhaust gas 6 are converted by a reducing agent 12 to environmentally friendly nitrogen and water using the selective catalytic reduction (SCR) method. Ammonia in particular is used as reducing agent 12.

As ammonia is a strong-smelling and—in a higher concentration—also toxic compound, the requisite ammonia is obtained from a "harmless" reducing agent liquid 5, in the present case from an aqueous urea solution. For this purpose, the reducing agent liquid 5 is introduced by means of the apparatus 4 into the hot exhaust gas train 6, where it is then converted thermally to the reducing agent 12.

According to the figures the apparatus 4 for this purpose comprises a storage tank 20, in which the reducing agent liquid 5 is stored.

During normal operation the reducing agent liquid 5 is conveyed from the storage tank 20 through a feed line 22 into a delivery means 23, which here takes the form of an injection valve 24, through which the reducing agent liquid 5 is delivered into the hot exhaust gas 6. The reducing agent liquid 5 introduced into the hot exhaust gas 6 is then converted thermally to the reducing agent 12, for example by hydrolysis.

For conveying the reducing agent liquid 5 out of the storage tank 20 the apparatus 4 comprises a conveying means 26, which here takes the form of a diaphragm pump 28. By means of the diaphragm pump 28 the reducing agent liquid 5 is pumped in conveying direction 29 from the storage tank 20 through the feed line 22 into the delivery means 23.

According to the figures the apparatus 4 moreover comprises an intake line 30 and a return line 32. Disposed in the intake line 30 is a venting means 34 and in the return line 32 a shut-off means 36. The venting means 34 and the shut-off means 36 here are in each case a 2/2-way valve 38. Here, by a 2/2-way valve is meant a valve having 2 ports and 2 switch positions.

By means of the venting means 23 in the form of valve 38 it is possible to close or open the intake line 30 for passage of a gas 40 situated in the storage tank 20, such that in the open state of the venting means 34 the gas 32, for example a gas bubble, may be conveyed through the intake line 30 from the storage tank 20 into the feed line 22.

The delivery means 23 in the form of injection valve 24 is connected by the return line 32 to the storage tank 20. By means of the valve 38 disposed in the return line 32 the return line 32 may be opened or closed in the direction of the storage tank 20. On the return line 32 for example a number of sensors 33, for example pressure- and/or temperature sensors, are disposed.

FIG. 1 shows the shut-off means 36 and the venting means 34 during normal operation. For this purpose both means 34, 36 are situated in a closed valve-switch position. In concrete terms, this means that no gas 40 may be conveyed through the intake line 30 into the feed line 22 and that the return line 32 is closed in the direction of the storage tank 20. In this valve-switch position of the venting means 34 and shut-off means 36, upon an actuation of the diaphragm pump 28 the reducing agent liquid 5 is pumped out of the storage tank 20 and injected at a delivery pressure of ca. 10 bar through the injection valve 24 into the exhaust gas 6.

Figure 2:
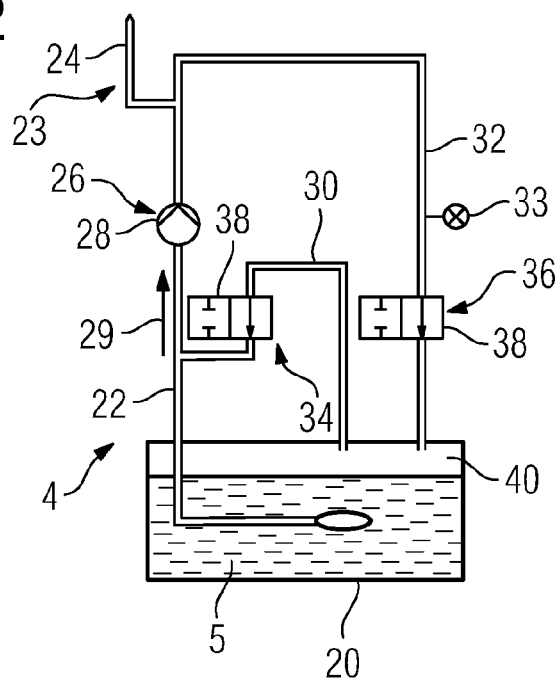
FIG. 2 the apparatus represented in FIG. 1 in a second operating state.

FIG. 2 shows the shut-off means 36 and the venting means 34 during an emptying operation. Both means 34, 36 for this purpose are situated in each case in an open valve-switch position. In the situation of the open venting means 34 this means that gas 40 from the storage tank 20 may be conveyed through the intake line 30 into the feed line 22. In the situation of the open shut-off means 36 this means that the return line 32 is open in the direction of the storage tank 20.

Upon actuation the diaphragm pump 28, because of the open venting means 34, does not convey the "heavy" reducing agent liquid 5 out of the storage tank 20 but to a certain extent "sucks" the "light" gas 40, for example a gas bubble, out of the storage tank 20, through the intake line 30 into the feed line 22. The gas bubble thus sucked in is conveyed by the diaphragm pump 28 in the direction of the injection valve 24. In the process the gas bubble pushes the reducing agent liquid 5, which is situated in the feed line 22 and is to be emptied, in conveying direction 29 through the feed line 22 to the injection valve 24.

The shut-off means 36 in the representation is likewise open, with the result that the return line 32 is open in the direction of the storage tank 20. There is therefore no build-up of delivery pressure at the injection valve 24, with the result that the reducing agent liquid 5 displaced by the gas bubble to the injection valve 24 is not delivered through the injection valve 24. Instead, the reducing agent liquid 5 is displaced by the gas bubble into the return line 32 and then into the storage tank 20.

The reducing agent liquid 5 is therefore emptied out of the feed line 22 into the storage tank 20 without requiring a reversal of the conveying direction 29 of the conveying means 26, in this case the diaphragm pump 28.

Figure 3:
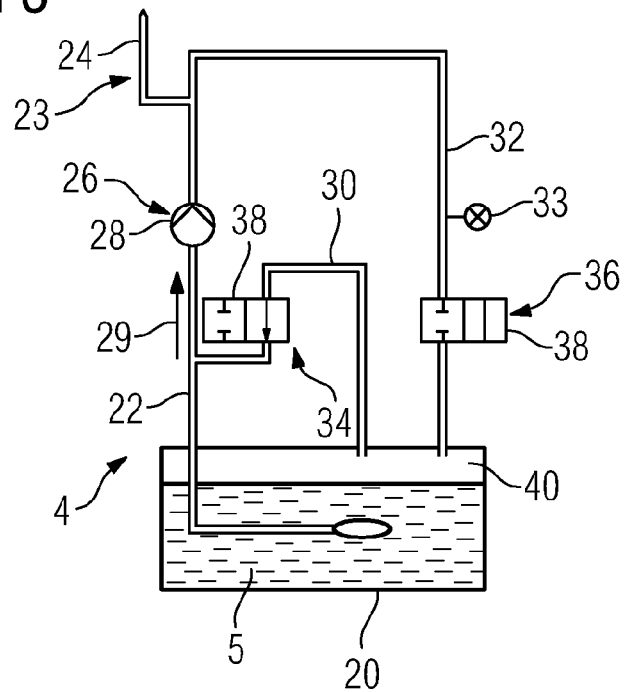
FIG. 3 the apparatus represented in FIG. 1 in a third operating state.

FIG. 3 shows the venting means 34 in an open valve-switch position and the shut-off means 36 in a closed valve-switch position.

In the situated represented here, it is possible to realize in particular a purging of the feed line 22. Upon an actuation of the diaphragm pump 28, the diaphragm pump 28 "sucks" gas 40 from the storage tank 20 through the intake line 30 into the feed line 22. As the return line 32 is closed in the direction of the storage tank 20, there is no pressure relief into the storage tank 20, rather a delivery pressure is built up at the delivery means 23.

As a result, the gas 40 "sucked" out of the storage tank 20 by the diaphragm pump 28 is delivered, together with the reducing agent liquid 5 situated in the feed line 22, through the injection valve 24. The feed line 22 is therefore purged. It is therefore possible for example to prevent a clogging of the feed line 22 with adhering residues. As no additional purging valve is required, a purging of the feed line 22 may be realized in a particularly simple, economical manner.

Figure 4:
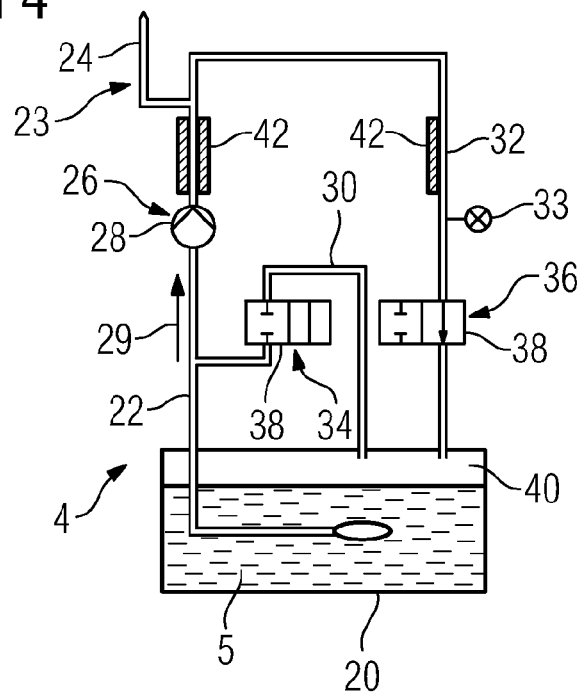
FIG. 4 an apparatus in a fourth operating state.

FIG. 4 shows the venting means 34 in a closed valve-switch position and the shut-off means 36 in an open valve-switch position.

In the situation represented here, it is possible to realize in particular an in-circuit pumping of the reducing agent liquid 5. Upon an actuation of the diaphragm pump 28, the diaphragm pump 28 pumps reducing agent liquid 5 out of the storage tank 20 into the feed line 22 and in conveying direction 29 to the injection valve 24. Because of the lack of delivery pressure the reducing agent liquid 5 is not delivered through the injection valve 24 but carried away through the return line 32 into the storage tank 20.

In the embodiment of the apparatus 4 represented here, a heating apparatus 42 is additionally disposed on the return line 32 and on the feed line 22. By means of the heating apparatus 42 the reducing agent liquid 5 situated in the feed line 22 and the return line 32 may be heated. It is therefore possible for example at low temperatures to prevent freezing of the reducing agent liquid 5 in the feed line 22 and the return line 32.

In the valve position of the shut-off means 36 and venting means 34 that is represented here, it is further possible by means of the heating apparatus 42 to heat the reducing agent liquid 5 in the storage tank 20 in that as a result of the in-circuit pumping the reducing agent liquid 5 is heated as it passes through the feed line 22 and the return line 32, and the liquid 5 thus heated is fed back to the storage tank 20.

The invention claimed is:

1. An apparatus for introducing a reducing agent liquid into an exhaust gas of a combustion system, comprising:
   a storage tank storing a volume of reducing agent liquid and a volume of reducing agent gas,
   a delivery means for delivering the reducing agent liquid into the exhaust gas,
   a feed line disposed between the storage tank and the delivery means,
   a conveying pump disposed in the feed line and configured to convey the reducing agent liquid in a conveying direction from the storage tank to the delivery means,
   a venting line connecting the storage tank to the feed line at a location upstream of the conveying pump, the venting line opening into the storage tank at a venting line opening communicating with the volume of reducing agent gas in the storage tank, and
   an actuable venting valve disposed along the venting line and movable between an open and a closed position,
   wherein the delivery means is connected by a return line to the storage tank, and an actuable shut-off valve is disposed in the return line, the return line opening into the storage tank at a return line opening communicating with the volume of reducing agent gas in the storage tank,
   wherein during an emptying operation, the venting valve and the shut-off valve are both arranged in an open position to form an open circuit to empty the feed line of liquid reducing agent gas by a flow of the reducing agent gas facilitated by the conveying pump, the open circuit allowing a flow of the reducing agent from the storage tank, through the venting line via the open venting valve, through the conveying pump, through the return line and back into the storage tank via the open shut-off valve, and through the storage tank via the venting line opening and return line opening in the storage tank.

2. The apparatus according to claim 1, wherein a heating apparatus is associated with at least one of the return line and the feed line.

3. The apparatus according to claim 1, wherein the venting valve and the shut-off valve are 2/2-way valves.

4. The apparatus according to claim 1, wherein the delivery means comprises an injection valve.

5. The apparatus according to claim 1, wherein the conveying pump is a diaphragm pump.

6. A method for introducing a reducing agent liquid into an exhaust gas of a combustion system, comprising the steps of:
   providing a system including:
      a storage tank storing reducing agent liquid and reducing agent gas,
      a delivery means for delivering the reducing agent liquid into the exhaust gas, a feed line disposed between the storage tank and the delivery means, a conveying pump disposed in the feed line a venting line connecting the storage tank to the feed line at a location upstream of the conveying pump, and an actuable venting valve disposed along the venting line and movable between an open and a closed position, the venting line opening into the storage tank at a venting line opening communicating with the volume of reducing agent gas in the storage tank, and a return line disposed between the delivery means to the storage tank, and an actuable shut-off valve disposed in the return line, the return line opening into the storage tank at a return line opening communicating with the volume of reducing agent gas in the storage tank, and for an emptying operation, actuating the venting valve and the shut-off valve to an open position to form an open circuit to empty the feed line of liquid reducing agent gas by a flow of the reducing agent gas facilitated by the conveying pump, the open circuit providing a flow of the reducing agent from the storage tank, through the venting line via the open venting valve, through the conveying pump, through the return line and back into the storage tank via the open shut-off valve, and through the storage tank via the venting line opening and return line opening in the storage tank.

7. The method according to claim 6, wherein a heating apparatus is associated with at least one of the return line and the feed line.

8. The method according to claim 6, wherein the venting valve and the shut-off valve are ⅔-way valves.

9. The method according to claim 6, the delivery means comprises an injection valve.

10. The method according to claim 6, the conveying pump is a diaphragm pump.

11. The method according to claim 6, comprising performing an emptying operation by actuating the venting valve to an open position and actuating the shut-off valve to an open position, wherein the emptying operation empties reducing agent liquid out of the feed line and into the storage tank.

12. The method according to claim 6, comprising performing a purging operation by actuating the venting valve to an open position and actuating the shut-off valve to a closed position, wherein the purging operation purges the feed line of residues.

* * * * *